(12) United States Patent
Aoki

(10) Patent No.: US 9,424,527 B2
(45) Date of Patent: Aug. 23, 2016

(54) INFORMATION PROCESSING SYSTEM, NETWORK STRUCTURE LEARNING DEVICE, LINK STRENGTH PREDICTION DEVICE, LINK STRENGTH PREDICTION METHOD AND PROGRAM

(75) Inventor: Kenji Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 14/128,691

(22) PCT Filed: Jun. 22, 2012

(86) PCT No.: PCT/JP2012/065949
§ 371 (c)(1),
(2), (4) Date: Dec. 23, 2013

(87) PCT Pub. No.: WO2012/176863
PCT Pub. Date: Dec. 27, 2012

(65) Prior Publication Data
US 2014/0122393 A1 May 1, 2014

(30) Foreign Application Priority Data
Jun. 24, 2011 (JP) ................................. 2011-140112

(51) Int. Cl.
*G06N 99/00* (2010.01)
*G06Q 10/10* (2012.01)
*G06Q 30/02* (2012.01)

(52) U.S. Cl.
CPC ............ *G06N 99/005* (2013.01); *G06Q 10/101* (2013.01); *G06Q 30/0202* (2013.01)

(58) Field of Classification Search
CPC .................................................. G06N 99/005
See application file for complete search history.

(56) References Cited

U.S. PATENT DOCUMENTS

| 2007/0118498 A1* | 5/2007 | Song ................ G06F 17/30702 |
| 2009/0077079 A1* | 3/2009 | Rettinger .............. G06Q 30/08 |
| 2010/0076913 A1* | 3/2010 | Yang ..................... G06N 7/005 706/13 |
| 2010/0198761 A1* | 8/2010 | Meng ..................... G06N 7/005 706/12 |

FOREIGN PATENT DOCUMENTS

| JP | 2010-250377 | 11/2010 |
| WO | WO 2009/107412 A1 | 9/2009 |

OTHER PUBLICATIONS

Tang et al., A Combination Approach to Web User Profiling, Dec. 2010, ACM Transactions on Knowledge Discovery from Data, vol. 5, No. 1, Article 2, pp. 1-44.*

Sakiko Moriyasu et al., "Link Prediction for Question-Answering Bulletin Boards", Information Processing Society of Japan, vol. 2, No. 1, pp. 10-21, Feb. 2009.

(Continued)

*Primary Examiner* — Alan Chen
(74) *Attorney, Agent, or Firm* — Finnegan, Henderson, Farabow, Garrett & Dunner LLP

(57) ABSTRACT

An information processing system separately generates sample sequences from a posterior distribution of each random variable in a probability model representing the structure of a template network that serves as a template for a plurality of networks whose network structures are to be learned, and from a posterior distribution of each random variable in a probability model representing the structures of the plurality of networks, using learning data and hyperparameters relating to the plurality of networks. Next, the information processing system derives a predictive value of the strength of a link specified by an external variable based on the external variable and on the sample sequences.

14 Claims, 3 Drawing Sheets

(56) References Cited

OTHER PUBLICATIONS

Hisashi Kashima et al., "Link Propagation: A Semi-supervised Approach to Link Prediction", IBM Tokyo Research Laboratory et al., SIG-FPAI-A804-04, 9 pages, Mar. 2009.

Hisashi Kashima, "Survey of Network Structure Prediction Methods", Journal of Japanese Society for Artificial Intelligence, vol. 22, No. 3, pp. 344-351, May 2007.

Peter D. Hoff, "Bilinear Mixed-Effects Models for Dyadic Data", Journal of the American Statistical Association, vol. 100, No. 469, pp. 286-295, Mar. 2005.

Hisashi Kashima et al., "Link Propagation: A Fast Semi-supervised Learning Algorithm for Link Prediction", Proceedings of the 9th SIAM International Conference on Data Mining (SDM 2009), pp. 1100-1111.

Peter D. Hoff, "Modeling homophily and stochastic equivalence in symmetric relational data", Advances in Neural Information Processing Systems, vol. 20, pp. 657-664.

Yu Zhang et al., "Multi-Domain Collaborative Filtering", Proceedings of the 26th Conference on Uncertainly in Artificial Intelligence (UAI 2010), pp. 1-8.

International Search Report mailed Sep. 11, 2012.

\* cited by examiner

US 9,424,527 B2

INFORMATION PROCESSING SYSTEM, NETWORK STRUCTURE LEARNING DEVICE, LINK STRENGTH PREDICTION DEVICE, LINK STRENGTH PREDICTION METHOD AND PROGRAM

CROSS-REFERENCE TO RELATED PATENT APPLICATIONS

This application is a National Stage Entry of International Application No. PCT/JP2012/065949, filed on Jun. 22, 2012, which is based upon and claims the benefit of priority from Japanese Patent Application No. 2011-140112 filed on Jun. 24, 2011. The entire contents of the above-referenced applications are expressly incorporated herein by reference.

TECHNICAL FIELD

The present invention relates to an information processing system, network structure learning device, link strength prediction device, link strength prediction method and program, and particularly to an information processing system, network structure learning device, link strength prediction device, link strength prediction method and program that deal with matters of network structure learning and link prediction in the data mining field.

BACKGROUND

Methods that analyze the strength of connections between users in social network services or the prediction of users' preferences regarding products in online shopping as matters of the structure of a network and the link strength thereof have been proposed. Non-Patent Literature 1 proposes an analytical method that simultaneously performs link prediction on a plurality of types of links between nodes in a network.

Further, Non-Patent Literature 2 proposes a flexible analytical method that expresses to what extent structural differences described above exist between networks as a probability model. As an application of this analytical method, data of different product categories available online are simultaneously analyzed, and the results indicate that the method is capable of predicting users' preferences more accurately than when each data of individual product categories are separately analyzed.

Non-Patent Literatures 3 and 4 are reference documents regarding hierarchical models.

CITATION LIST

[Non-Patent Literature] (NPL)

[Non-Patent Literature 1]
Hisashi Kashima, Tsuyoshi Kato, Yoshihiro Yamanish, Masashi Sugiyama, and Koji Tsuda, "Link Propagation: A Fast Semi-supervised Learning Algorithm for Link Prediction," Proceedings of the 9$^{th}$ SIAM International Conference on Data Mining (SDM 2009), pp. 1099-1110.
[Non-Patent Literature 2]
Yu Zhang, Bin Cao, and Dit-Yan Yeung, "Multi-Domain Collaborative Filtering," Proceedings of the 26th Conference on Uncertainly in Artificial Intelligence (UAI 2010).
[Non-Patent Literature 3]
Peter D. Hoff, "Bilinear Mixed-Effects Models for Dyadic Data," Journal of the American Statistical Association, 100, 469, pp. 286-295.
[Non-Patent Literature 4]
Peter D. Hoff, "Modeling Homophily and Stochastic Equivalence in Symmetric Relational Data," Advances in Neural Information Processing Systems, 20, pp. 657-664.

SUMMARY

The following analysis is given by the present invention. The analytical method of Non-Patent Literature 1 simultaneously predicts a plurality of links between nodes in a network and this is thought to be equivalent to simultaneously treating a plurality of networks. This analytical method, however, has a problem that differences in properties that may exist among different types of links (i.e., to what extent the structures of links between nodes are different between different types of links) are not taken into account. Therefore, when a predetermined amount of structural differences or more exists between different link types, the prediction accuracy may decrease due to the fact that a plurality of link types are simultaneously predicted, compared to a case where each link is individually predicted.

Further, the method of Non-Patent Literature 2 has a problem that the data formats to which the method can be applied are restricted since purchasing users must be the same between product categories.

Therefore, in order to predict link strengths based on data obtained from a plurality of networks, similarities in the structure of each network and cases where the number of data obtained from each network varies greatly must be taken into consideration.

It is an object of the present invention to provide an information processing system, network structure learning device, link strength prediction device, link strength prediction method, and program capable of accurately learning the structures of a plurality of networks and of predicting link strengths assuming that each network has a different structure.

According to a first aspect, there is provided an information processing system comprising a first input unit that receives learning data and hyperparameters relating to a plurality of networks; a network structure learning unit that outputs a sample sequence generated from a posterior distribution of each random variable in a probability model representing the structure of a template network that serves as a template for a plurality of networks whose network structures are to be learned, and a sample sequence generated from a posterior distribution of each random variable in a probability model representing the structures of the plurality of networks, using the learning data and the hyperparameters; a learning result output unit that outputs sample sequences from a posterior distribution of each random variable in probability models representing the structures of each of the networks and of the template network; a second input unit that receives an external variable relating to a pair of nodes in a network in which link strengths are to be predicted, and sample sequences outputted from the learning result output unit and generated from a posterior distribution of each random variable in probability models representing the structures of the template network and of each of the networks; a link strength prediction unit that derives a predictive value of the strength of a link specified by the external variable based on the external variable and on sample sequences generated from a posterior probability distribution of each random variable in probability models representing the structures of the template network and of each of the networks; and a prediction result output unit that outputs the strength of a link specified by the external variable.

According to a second aspect, there are provided a network structure learning device and link strength prediction device that constitute the information processing system described above.

According to a third aspect, there is provided a link strength prediction method comprising separately generating sample sequences from a posterior distribution of each random variable in a probability model representing the structure of a template network that serves as a template for a plurality of networks whose network structures are to be learned, and from a posterior distribution of each random variable in a probability model representing the structures of the plurality of networks, using learning data and hyperparameters relating to the plurality of networks; and deriving a predictive value of the strength of a link specified by an external variable, relating to a pair of nodes in a network in which link strengths are to be predicted, based on the external variable and on sample sequences generated from a posterior probability distribution of each random variable in probability models representing the structures of the template network and of each of the networks. The present method is tied to a particular machine, which is an information processing system that learns the structures of a plurality of networks and that predicts the strength of any link thereof.

According to a fourth aspect, there are provided computer programs realizing the network structure learning device and the link strength prediction device that constitute the information processing system described above. Further, these programs can be stored in a computer-readable storage medium. In other words, the present invention can be realized as a computer program product.

The meritorious effects of the present invention are summarized as follows.

According to the present disclosure, it becomes possible to accurately learn the structures of a plurality of networks and predict link strengths even when the structure of each of these networks is different from each other.

MODES

Exemplary Embodiment 1

Figure 1:
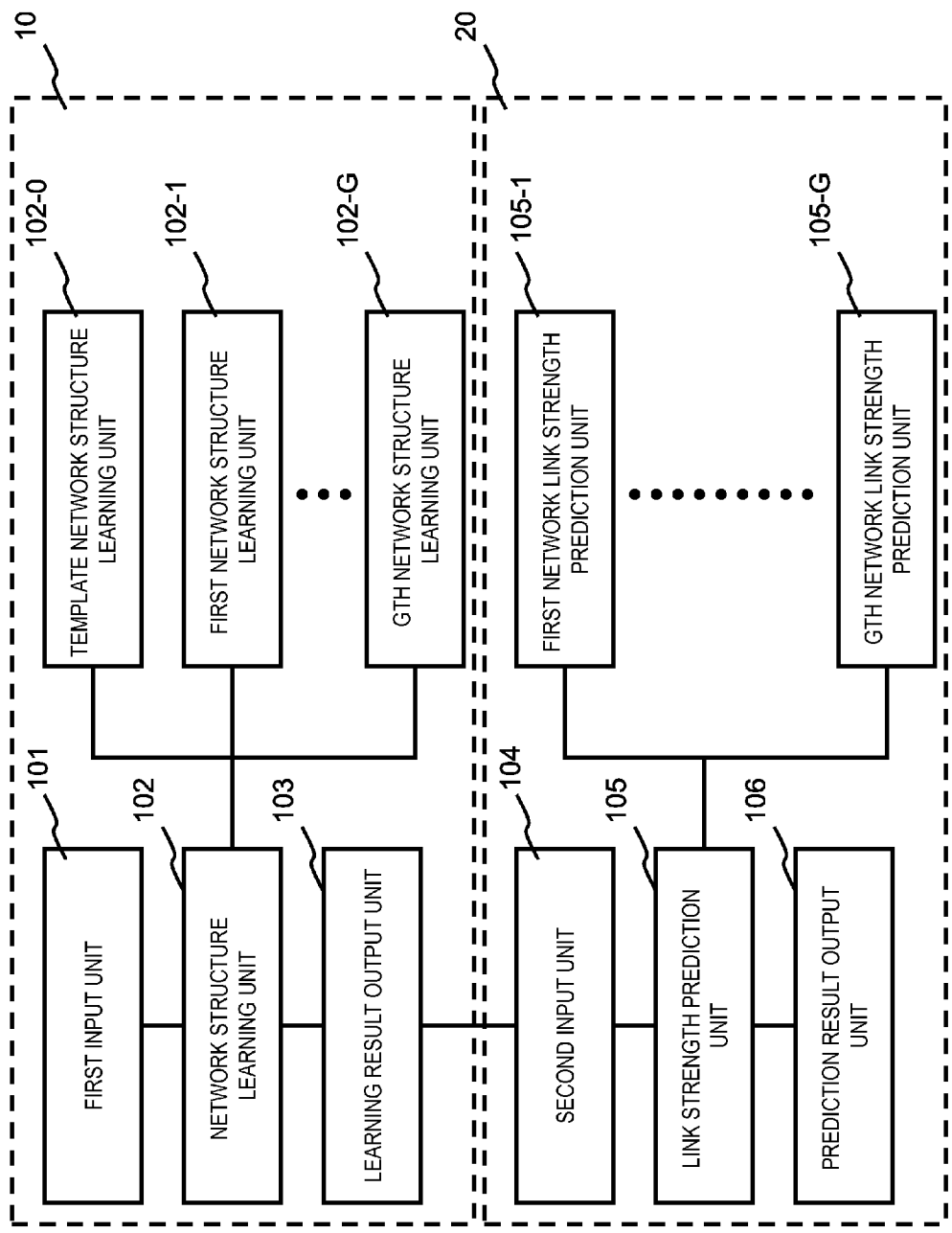
FIG. 1 is a block diagram showing the configuration of an information processing system of a first exemplary embodiment of the present disclosure.

Next, a first exemplary embodiment of the present disclosure will be described in detail with reference to the drawings. In the present exemplary embodiment below, a link strength is represented by a real number. Further, for each pair of nodes, some external variables representing information such as properties and characteristics between the nodes are observed.

In the present exemplary embodiment below, it is assumed that a template network, a template for individual network data, exists and that the template network is generated from a probability distribution. It is further assumed that data relating to each network are generated from a probability distribution based on the template network. With these assumptions above, a hierarchical model in the present exemplary embodiment is assumed.

$$p(y,w,s^2,b,t|X,\kappa,\lambda,\beta,\sigma,\mu,\nu) = p(y|X,w,s^2)p(w|b,t)p(s^2|\kappa,\lambda)p(b|\beta,\sigma)p(t|\mu,\nu)$$ [Math. 1]

$$y=(y_1,\ldots,y_G), y_g=(y_{g1},\ldots,y_{gN_R})^t, g=1,\ldots,G$$ [Math. 2]

$$X=(X_1,\ldots,X_G), X_g=(x_{g1},\ldots,x_{gN_R})^t=(x_{g(1)},\ldots,x_{g(D)}), g=1,\ldots,G$$ [Math. 3]

$$w=(w_1,\ldots,w_G), w_g=(w_{g1},\ldots,w_{gD})^t, g=1,\ldots,G$$ [Math. 4]

$$b=(b_1,\ldots,b_D)^t, t=(t_1^2,\ldots,t_D^2)^t$$ [Math. 5]

$$\beta=(\beta_1,\ldots,\beta_D)^t, \sigma=(\sigma_1^2,\ldots,\sigma_D^2)^t$$ [Math. 6]

Note that p (A|B, C) denotes the conditional probability distribution of a random variable A with a random variable B given, and C denotes a parameter of this conditional probability distribution. Further, y denotes the strength of a link. X denotes an external 190 variable. $N_g$ denotes the number of links (i.e., pairs of nodes) observed in a gth network. G denotes the number of targeted network data. D denotes the number of external variables. Further, $\kappa$, $\lambda$, $\beta$, $\sigma$, $\mu$, and $\nu$ are hyperparameters.

As the probability distribution on the right side of [Math. 1], the following is assumed.

$$p(y|X,w,s^2) = \prod_{g=1}^{G} \prod_{n_R=1}^{N_R} N(y_{gn_g}, w_g^t x_{gn_R}, s^2)$$ [Math. 7]

$$p(w|b,t) = \prod_{g=1}^{G} N(w_g, b, \mathrm{diag}(t))$$ [Math. 8]

$$p(s^2|\kappa,\lambda) = IG(s^2, \kappa, \lambda)$$ [Math. 9]

$$p(b|\beta,\sigma) = N(b, \beta, \mathrm{diag}(\sigma))$$ [Math. 10]

$$p(t|\kappa,\lambda) = \prod_{d=1}^{D} IG(t_2^d, \mu, \upsilon)$$ [Math. 11]

Note that N ($*$, $\lambda$, $\Sigma$) denotes the multidimensional normal distribution of the mean vector n and a covariance matrix $\Sigma$. IG($*$, $\phi$, $\psi$) denotes the inverse-gamma distribution of a shape parameter ip and a scale parameter $\psi$.

Here, [Math. 10] and [Math. 11] express probability models of the template network. Further, [Math. 8] and [Math. 9] indicate that the probability model of each of the networks 1 to G is generated from the template network. Further, [Math. 7] indicates that network data for each network is generated from the probability model of each network.

With the assumptions above, the conditional probability 215 distribution of each random variable on the right side of [Math. 1] becomes a conjugate distribution, and a conditional posterior probability distribution is derived analytically. Therefore, it becomes possible to predict the posterior distribution of a random variable using a Gibbs sampler.

Next, the configuration of an information processing system of the first exemplary embodiment of the present disclosure that realizes link prediction using the hierarchical model above will be described in detail with reference to the drawing. FIG. 1 is a block diagram illustrating the configuration of the information processing system of the first exemplary embodiment of the present disclosure.

With reference to FIG. 1, the information processing system that includes a network structure learning device 10 and a link strength prediction device 20 is shown. The network structure learning device 10 is constituted by including a first input unit 101, a network structure learning unit 102, and a learning result output unit 103. Further, a template network structure learning unit 102-0 that learns the structure of the template network, and first to Gth network structure learning units 102-1 to 102-G that learn the structure of each network are connected to the network structure learning unit 102.

The link strength prediction device 20 is constituted by including a second input unit 104, a link strength prediction unit 105, and a prediction result output unit 106. Further, first to Gth network link strength prediction units 105-1 to 105-G that predict link strengths for each network are connected to the link strength prediction unit 105.

The first input unit 101 receives the input of learning data (y, X) 245 for learning a network structure and of the hyperparameters η, λ, β, σ, μ, and ν, stores them, and outputs them to the network structure learning unit 102.

The network structure learning unit 102 feeds the entered learning data (y, X) and hyperparameters κ, λ, β, σ, μ, and μ to the template network structure learning unit 102-0 and the first to the Gth network structure learning units 102-1 to 102-G. For instance, the number of email exchanges among employees at a corporation or the number of times that employees attended the same meeting can be used as the learning data, and in this case, as a link strength prediction, connections/relationships between employees, which are not obvious (but latent), can be analyzed. Further, examples of external variables described later include whether or not the sex, the position, the department, and the specialized field/skills matches between employees.

The template network structure learning unit 102-0 and the first to the Gth network structure learning units 102-1 to 102-G respectively generate and store sample sequences based on the posterior probability distribution of each random variable using a Gibbs sampler. Further, the generated sample sequences are outputted to the learning result output unit 103 via the network structure learning unit 102.

The learning result output unit 103 outputs the sample sequence based on the posterior probability distribution of each random variable entered by the network structure learning unit 102 to the outside of the device.

The second input unit 104 receives the input of an external 275 variable X* relating to a pair of nodes between which one wants to predict the strength of the link and of the sample sequence from the posterior probability distribution of each random variable, and outputs these to the link strength prediction unit 105.

The link strength prediction unit 105 feeds the entered external variable X* and the sample sequence from the posterior probability distribution of each random variable to the first to the Gth network link strength prediction units 105-1 to 105-G.

A gth network link strength prediction unit 105-g (g=1, ..., G) out of the first to the Gth network link strength prediction units 105-1 to 105-G predicts a link strength according to the following [Math. 12] using an average value AVE ($w_g$) of the sample sequence from the posterior probability distribution of $w_g$. Note that x*$_{gng}$ on the right 290 side of [Math. 12] denotes an external variable for a pair of nodes between which one wants to predict the strength of the link regarding a gth network.

$$y^*_{gn^*_R} = \overline{w}^t_g x^*_{gn_g}, n^*_g = 1, \ldots, N^*_g \quad \text{[Math. 12]}$$

Note that the example above is merely an example, and as an alternative, a method in which the posterior prediction probability distribution of a link strength is derived from a sample sequence from the posterior probability distribution of each random variable can be used.

The link strength predictive value on the left side of [Math. 12] predicted as described above is outputted to the prediction result output unit 106 via the link strength prediction unit 105.

The prediction result output unit 106 outputs the link strength predictive value supplied by the link strength prediction unit 105 to the outside of the device.

Further, each unit (processing means) of the network structure learning device 10 and the link strength prediction device 20 shown FIG. 1 can be realized by a computer that constitutes the network structure learning device 10 and the link strength prediction device 20 using the hardware thereof with a computer program having each processing described above executed.

Figure 2:
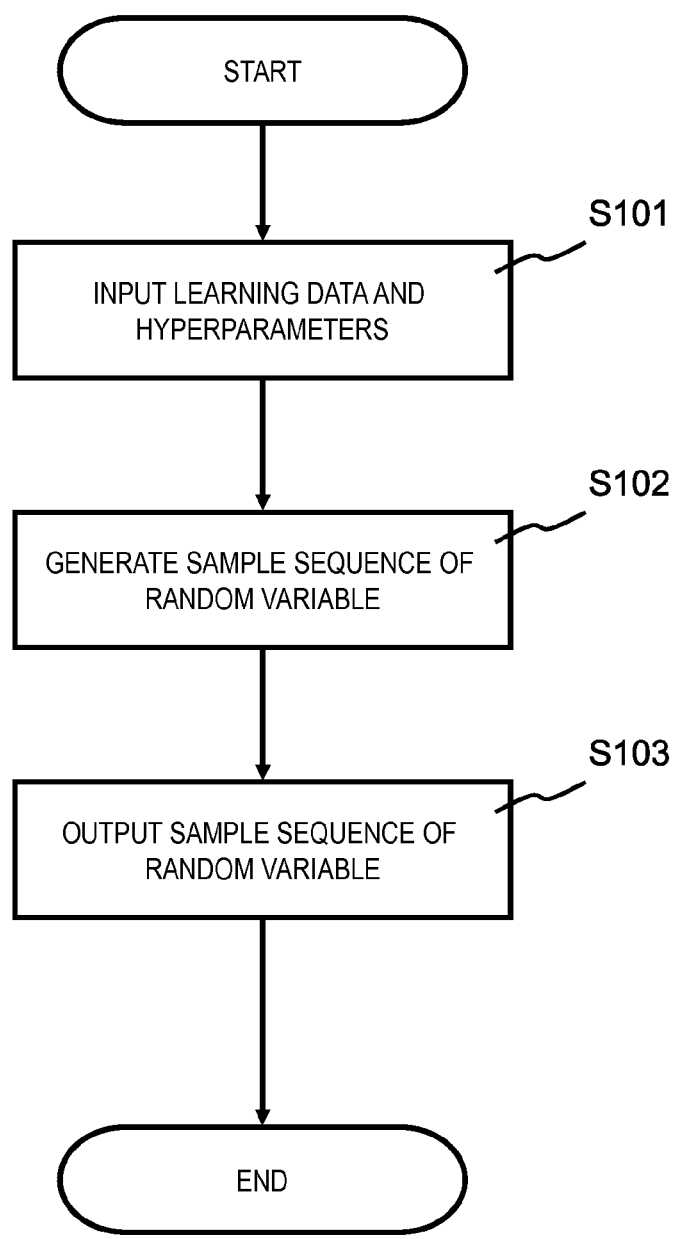
FIG. 2 is a flowchart showing the operation of the information processing system of the first exemplary embodiment of the present disclosure.
Figure 3:
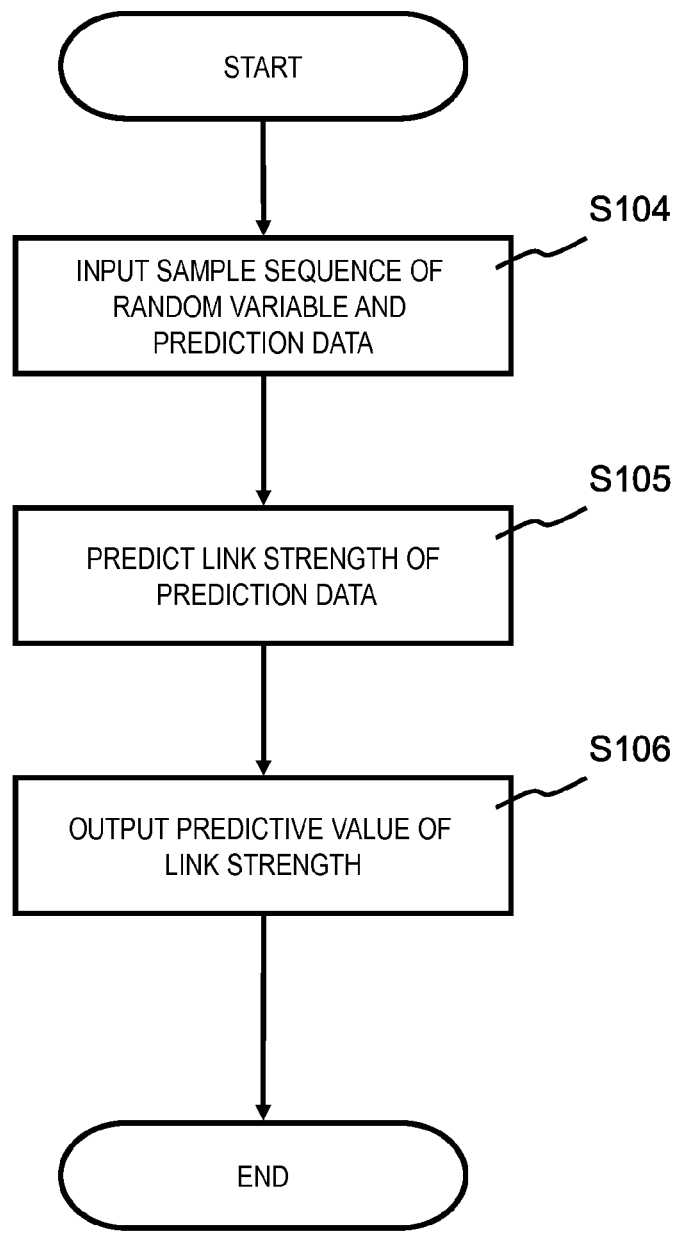
FIG. 3 is a continuation diagram of FIG. 2.

Next, the operation of the present exemplary embodiment will be described in detail with reference to the drawing. FIGS. 2 and 3 are flowcharts showing the operation of the information processing system of the first exemplary embodiment of the present disclosure.

With reference to FIG. 2, first the first input unit 101 receives the input of the learning data (y, X) for learning a network structure and of the hyperparameters κ, λ, β, β, σ, μ, and ν supplied from the outside of the device, stores them, and outputs them to the network structure learning unit 102 (step S101 in FIG. 2).

The network structure learning unit 102 generates and stores sample sequences for the entered learning data (y, X) and hyperparameters κ, λ, β, σ, μ, and ν based on the posterior probability distribution of each random variable using a Gibbs sampler (step S102 in FIG. 2). At this time, the template network structure learning unit 102-0 generates and stores sample sequences for b, t (refer to [Math. 10] and [Math. 11]), and the first to the Gth network structure learning units 102-1 to 102-G generate and store sample sequences for $w_g$, $s^2$ (refer to [Math. 8] and [Math. 9]).

The learning result output unit 103 outputs these sample sequences to an external device (step S103 in FIG. 2).

Next, with reference to FIG. 3, the second input unit 104 stores the external variable X* (prediction data), supplied from the outside of the device, relating to a pair of nodes between which one wants to predict the strength of the link and the sample sequence from the posterior probability distribution of each random variable, and then outputs these to the link strength prediction unit 105 (step S104 in FIG. 3).

The link strength prediction unit 105 calculates a predictive value of the link strength based on the supplied external variable X* (prediction data) and sample sequence from the posterior probability distribution of each random variable, and stores the predictive value (step S105 in FIG. 3).

The prediction result output unit 106 outputs the stored link strength predictive value to the outside of the device (step S106 in FIG. 3).

As described, according to the present exemplary embodiment, when data of a plurality of networks can be obtained, the accuracy of network structure learning represented by link prediction can be improved by simultaneously learning the data of the plurality of networks. (Here the accuracy improvement means that prediction can be performed with higher accuracy than when the network structure of each network is separately learned.) The reason is that the concept of hierarchical model, a type of statistical model, is utilized. By doing this, when links are predicted in a network, it becomes possible to utilize data information on other networks properly while taking into account similarities between networks. For instance, when the amount of data obtained is greatly different between networks, it becomes possible to compensate the instability of the learning accuracy for a network with a small amount of data by utilizing information on a network with a large amount of data.

Further, according to the present exemplary embodiment, parameter values of a hierarchical model can be learned, and these parameter values further provide additional information, such as to what extent the structures are different between networks.

Further, as evident from the explanations above, unlike the method of Non-Patent Literature 1, the present exemplary embodiment does not require all nodes to be the same between networks. In other words, since there is the advantage that a node included in a network does not have to be included in another, targeted data formats are not restricted.

An exemplary embodiment of the present disclosure has been described above, however, the present disclosure is not limited to the exemplary embodiment described and further modifications, substitutions, and adjustments can be added within the scope of the basic technological concept of the present disclosure. For instance, in the exemplary embodiment above, link strengths are expressed in real numbers and some external variables representing the properties of each node are assumed to have been observed, but it is possible to perform the same learning/prediction by assuming an appropriate linear model in a case where link strengths are expressed in binary numbers indicating the presence of a link, or link strengths are expressed in positive integers, instead real numbers.

Further, even in a case where external variables are not observed, it is possible to perform the same learning/prediction by using, for instance, hierarchical models described in Non-Patent Literatures 3 and 4. Note that, in this cases, learning/prediction is performed using the Metropolis-Hastings algorithm after an appropriate transition probability distribution is given, instead of Gibbs Sampling used in the present exemplary embodiment.

INDUSTRIAL APPLICABILITY

In addition to an analysis of connections between employees, when a new social network (referred to as "A" hereinafter) is launched, by utilizing information on an existing social network (referred to as "B" hereinafter), the present disclosure makes it possible to accurately predict the strengths of connections between users in A from the initial 415 phase of the implementation of A and recommend each user to other users with strong connections. Further, when the strengths of connections between users in A are predicted, the similarities between A and B are automatically determined and the information of B is utilized based on the degree of the similarities.

Further, the disclosure of Patent Literature listed above is incorporated herein by reference thereto.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

REFERENCE SIGNS LIST

10: network structure learning device
20: link strength prediction device
101: first input unit
102: network structure learning unit
102-0: template network structure learning unit
102-1 to 102-G: first to Gth network structure learning units
103: learning result output unit
104: second input unit
105: link strength prediction unit
105-1 to 105-G: first to Gth network link strength prediction units
106: prediction result output unit

What is claimed is:

1. An information processing system, comprising:
a memory that stores a set of instructions; and
one or more processors configured to execute the set of instructions to:
receive learning data and hyperparameters related to a plurality of networks;
generate a first sample sequence based on a posterior distribution of each random variable in a probability model representing a structure of a template network that serves as a template for a plurality of networks whose network structures are to be learned, and second sample sequences based on a posterior distribution of each random variable in probability models representing structures of the plurality of networks, using the learning data and the hyperparameters;
output the first and second sample sequences;
receive an external variable for a pair of network nodes between which a link strength is to be predicted, and the first and second sample sequences;
derive a predictive value of the link strength based on the external variable and on the first and second sample sequences; and
output the predictive value.

2. The information processing system according to claim 1, wherein the one or more processors are configured to execute the set of instructions to generate one of the second sample sequences for each of the plurality of networks.

3. The information processing system according to claim 2, wherein the one or more processors are configured to execute the set of instructions to derive a predictive value of a link strength for each of the plurality of networks.

4. The information processing system according to claim 1, wherein the one or more processors are configured to execute the set of instructions to derive a predictive value of a link strength for each of the plurality of networks.

5. A network structure learning apparatus, comprising:
a memory that stores a set of instructions; and
one or more processors configured to execute the set of instructions to:
receive learning data and hyperparameters related to a plurality of networks;
generate a first sample sequence based on a posterior distribution of each random variable in a probability model representing a structure of a template network that serves as a template for a plurality of networks whose network structures are to be learned, and second sample sequences based on a posterior distribution of each random variable in probability models representing structures of the plurality of networks, using the learning data and the hyperparameters; and
output the first and second sample sequences.

6. The network structure learning apparatus according to claim 5, wherein the one or more processors are configured to execute the set of instructions to generate one of the second sample sequences for each of the plurality of networks.

7. A link strength prediction apparatus, comprising:
a memory that stores a set of instructions; and
one or more processors configured to execute the set of instructions to:
receive an external variable for a pair of network nodes between which a link strength is to be predicted, and sample sequences outputted from a learning result output apparatus and generated based on a posterior distribution of each random variable in probability models representing structures of a template network and of each of a plurality of networks;
derive a predictive value of the link strength based on the external variable and on the sample sequences; and
output the predictive value.

8. The link strength prediction apparatus according to claim 7, wherein the one or more processors are configured to execute the set of instructions to derive a predictive value of a link strength for each of the plurality of networks.

9. A link strength prediction method, comprising:
generating a first sample sequence based on a posterior distribution of each random variable in a probability model representing a structure of a template network that serves as a template for a plurality of networks of which network structures are to be learned, and second sample sequences based on a posterior distribution of each random variable in probability models representing structures of the plurality of networks, using learning data and hyperparameters related to the plurality of networks; and
deriving a predictive value of a link strength for a pair of nodes between which the link strength is to be predicted, based on an external variable and on the first and second sample sequences.

10. A network structure learning method, comprising:
receiving learning data and hyperparameters related to a plurality of networks;
generating a first sample sequence based on a posterior distribution of each random variable in a probability model representing a structure of a template network that serves as a template for a plurality of networks of which network structures are to be learned, and second sample sequences based on a posterior distribution of each random variable in probability models representing structures of the plurality of networks, using the learning data and the hyperparameters; and
outputting the first and second sample sequences.

11. An information processing method, comprising:
receive learning data and hyperparameters related to a plurality of networks;
generating a first sample sequence based on a posterior distribution of each random variable in a probability model representing a structure of a template network that serves as a template for a plurality of networks of which network structures are to be learned, and second sample sequences based on a posterior distribution of each random variable in probability models representing structures of the plurality of networks, using the learning data and the hyperparameters;
outputting the first and second sample sequences;
receiving an external variable for a pair of network nodes between which a link strength is to be predicted, and the first and second sample sequences;
deriving a predictive value of the link strength based on the external variable and on the first and second sample sequences; and
outputting the predictive value.

12. A non-transitory computer readable medium storing instructions that are executable by one or more processors to cause the one or more processors to execute an information processing method, the method comprising:
receive learning data and hyperparameters related to a plurality of networks;
generating a first sample sequence based on a posterior distribution of each random variable in a probability model representing a structure of a template network that serves as a template for a plurality of networks of which network structures are to be learned, and second sample sequences based on a posterior distribution of each random variable in probability models representing structures of the plurality of networks, using the learning data and the hyperparameters;
outputting the first and second sample sequences;
receiving an external variable for a pair of network nodes between which a link strength is to be predicted, and the first and second sample sequences;
deriving a predictive value of the link strength based on the external variable and on the first and second sample sequences; and
outputting the predictive value.

13. A non-transitory computer readable medium storing instructions that are executable by one or more processors to cause the one or more processors to execute a link strength prediction method, the method comprising:
generating a first sample sequence based on a posterior distribution of each random variable in a probability model representing a structure of a template network that serves as a template for a plurality of networks of which network structures are to be learned, and second sample sequences based on a posterior distribution of each random variable in probability models representing structures of the plurality of networks, using learning data and hyperparameters related to the plurality of networks; and
deriving a predictive value of a link strength for a pair of nodes between which the link strength is to be predicted, based on an external variable and on the first and second sample sequences.

14. A non-transitory computer readable medium storing instructions that are executable by one or more processors to cause the one or more processors to execute a network structure learning method, the method comprising:
receiving learning data and hyperparameters related to a plurality of networks;
generating a first sample sequence based on a posterior distribution of each random variable in a probability model representing a structure of a template network that serves as a template for a plurality of networks of which network structures are to be learned, and second sample sequences based on a posterior distribution of each random variable in probability models representing structures of the plurality of networks, using the learning data and the hyperparameters; and
outputting the first and second sample sequences.

* * * * *